United States Patent [19]

Jackson

[11] Patent Number: 4,516,705
[45] Date of Patent: May 14, 1985

[54] PANNIER WITH HOOK AND SPRING MECHANISM

[76] Inventor: W. Shaun Jackson, Eclipse, Inc. P.O. Box 7370, Ann Arbor, Mich. 48107

[21] Appl. No.: 568,632

[22] Filed: Jan. 6, 1984

[51] Int. Cl.³ ............................................. B62J 9/00
[52] U.S. Cl. .................................... 224/32 A; 224/42
[58] Field of Search ............... 224/32 R, 32 A, 33 R, 224/39, 42, 30 R

[56] References Cited

U.S. PATENT DOCUMENTS

| | | | |
|---|---|---|---|
| 3,786,972 | 1/1974 | Alley | 224/32 A X |
| 3,903,944 | 9/1975 | Montgomery et al. | 224/32 R |
| 3,937,374 | 2/1976 | Hine, Jr. | 224/32 A |
| 3,955,727 | 5/1976 | Montgomery | 224/32 A X |
| 4,262,829 | 4/1981 | Hine, Jr. et al. | 224/32 A X |

Primary Examiner—Stephen Marcus
Assistant Examiner—Robert Petrik
Attorney, Agent, or Firm—Krass & Young

[57] ABSTRACT

A pannier mounting mechanism for use on wheeled vehicles such as bicycles employs a plurality of hook members adapted to engage the upper portion of the carrier frame on a bicycle and a spring-loaded lower anchor which engages the lower portion of the carrier frame. When installed the springs are maintained in tension resulting in a generally downward force which insures that the hook members are maintained in engagement with the carrier frame despite any inertial forces resulting from jostling during transport.

5 Claims, 5 Drawing Figures

PANNIER WITH HOOK AND SPRING MECHANISM

TECHNICAL FIELD

This invention relates generally to panniers which are releasably mountable on bicycle carrier frames or the like and more particularly to an improved hook and spring mechanism which releasably secures the pannier to the carrier frame.

BACKGROUND ART

Various means for releasably securing panniers (saddlebags) to the frames of vehicles such as bicycles are known in the art. The panniers are typically mounted upon a carrier frame. This carrier frame is bolted to the frame of the bicycle and provides a rigid support for the pannier. The pannier itself is typically provided with straps, clamps, or other means for releasably securing the bag to the carrier frame.

One method for releasably securing the pannier to the frame is to utilize several spring-loaded hooks which grasp the members of the carrier frame and are of sufficient tension to secure the pannier to the frame during transport. One problem, however, with these hook and spring mechanisms is that, in order for the pannier to withstand the jostling of cross-country bicycle transport, the pannier must be securely mounted to the carrier frame. Thus, the securing means must provide stability during transport over rugged terrain and allow for quick and easy installation and removal.

The present invention is directed to overcoming the problems set forth above.

DISCLOSURE OF THE INVENTION

In accordance with one aspect of the present invention a pannier is provided which employs a pair of metal hooks which may be slidably positioned over the upper horizontal support member of the carrier frame, and a spring-loaded lower support mechanism which may be anchored to the lower portion of the carrier frame. The spring-loaded lower support mechanism preferably includes a horizontal support bar which is rigidly secured across the lower face of the pannier, a spacer tube having an inner diameter slightly larger than the diameter of the support bar and a pair of relatively high tension springs joined together by an anchor ring. Springs are mounted at each of their upper ends respectively upon the horizontal support bar. The ends of each of these springs are separated along the support bar by the spacer tube. Thus, a triangular configuration is formed when each of the springs is pulled into tension by the anchor ring. The pannier hooks are mounted over the upper horizontal member of the carrier frame and the anchor ring is hooked on the bottom portion of the carrier frame. The tension of the springs insures that the hooks will remain in their mounted position on the carrier frame. Also, because the springs are separated by the spacer tube, the spring-loaded restraining force is more equally distributed across the width of the pannier.

BEST MODE FOR CARRYING OUT THE INVENTION

Figure 1:
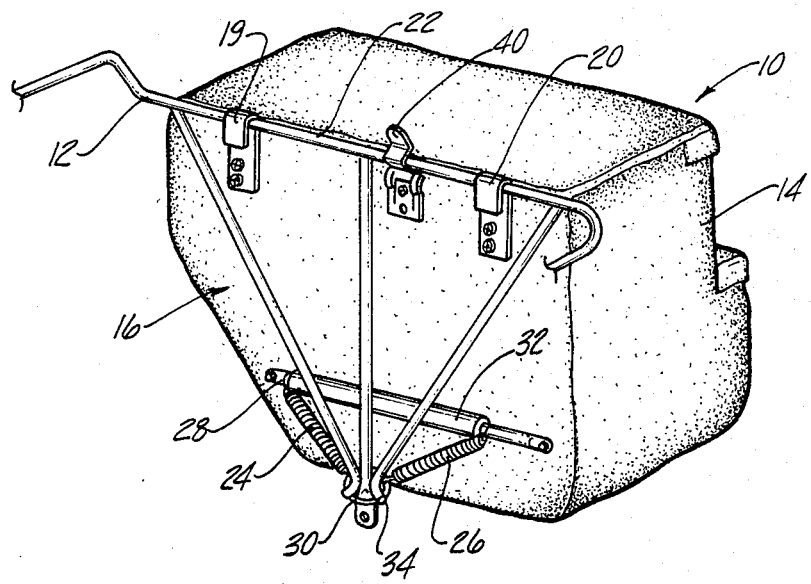
FIG. 1 is a perspective view of a pannier having a hook and spring mounting mechanism mounted on the cutaway portion of a carrier frame.
Figure 2:
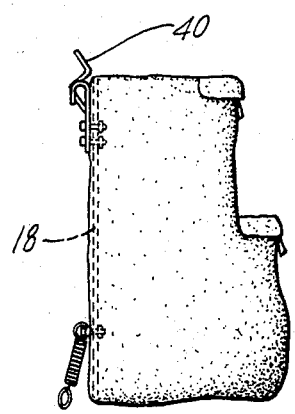
FIG. 2 is a back view of the pannier.

Referring to FIG. 1 a pannier 10 is shown mounted upon a suitable carrier frame 12. Pannier includes a relatively non-rigid bag 14 and a rigid support panel (not shown) which is secured to the back face 16 of the bag 14. The support panel is preferably mounted on the inside of the bag 14. Each of the components which comprise the mounting mechanism for the pannier 10 are simultaneously secured to the back face 16 of the bag 14 and the rigid support panel 18.

The mounting mechanism for the pannier 10 preferably includes a plurality of hooks 19-20 which engage the upper horizontal member 22 of the carrier frame, and a lower support mechanism which employs a pair of springs 24,26 mounted at each end respectively to a horizontal support bar 28 and an anchor ring 30. The end of spring 24 is separated from the end of spring 26 along the horizontal support bar by means of a spacer tube 32. This spacer tube is preferably made of a flexible plastic or rubber type material and has an inner diameter of sufficient width to allow for the tube to be slidably positioned along the horizontal support bar 28. The spacer tube is also of sufficient thickness that the spring ends may not easily slide over the spacer tube 32. Thus, as will be appreciated by those skilled in the art when the anchor ring 30 is pulled downward over a terminal end 34 of one of the support members of the carrier frame, each of the springs 24 and 26 is pulled into tension. Because the opposite ends of each of the springs 24,26 are maintained in a spaced relationship on the horizontal support bar 28 by the spacer tube 30 the springs 24,26 and the horizontal support bar 28 form a traingular support mechanism with the anchor ring 30 at the lower point of the triangle. The tension in each of the springs 24,26 exerts a downward force upon the horizontal support bar 28. This downward force tends to retain each of the hooks 19-20 in position over the upper support member 22 of the carrier frame 12 and thus insures that the pannier 10 will remain securely fastened to the carrier frame 12 during transport.

Figure 3:
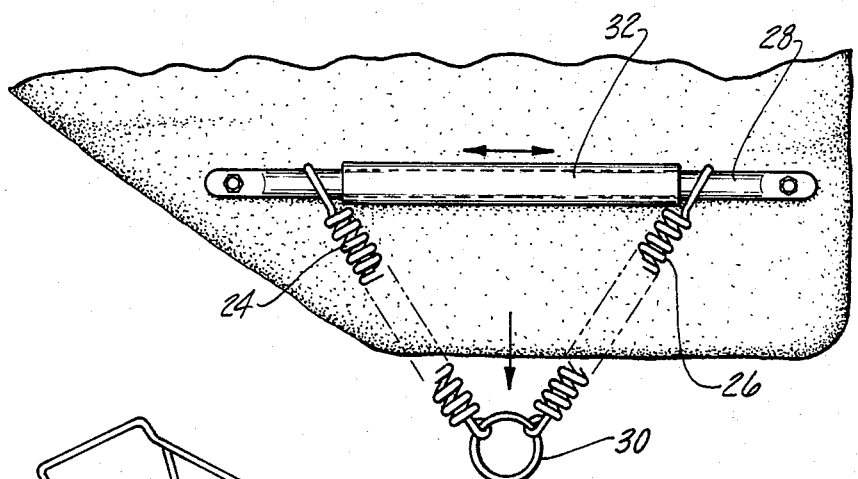
FIG. 3 is an isolated view of the lower support mechanism.
Figure 5:
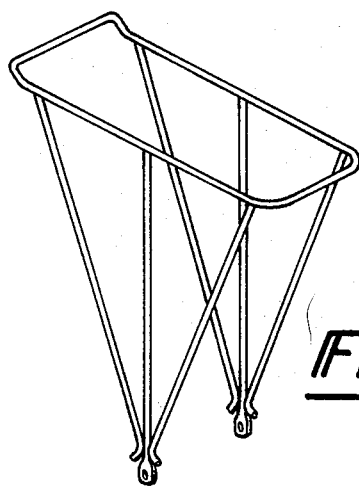
FIG. 5 is a perspective view of a carrier frame for the rear wheel of a bicycle.
Figure 4:
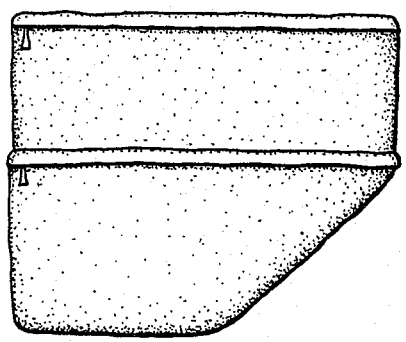
FIG. 4 is a side view of the pannier.

As shown in FIG. 3, maintaining each of the spring ends 24,26 in spaced relationship along the horizontal support 28 results in a more equal distribution of the downward forces when the springs are pulled into tension by the anchor ring 30. As will be appreciated by those skilled in the art spacer tubes of different lengths may be used to increase or decrease the tension in the springs 24,26. As will also be appreciated by those skilled in the art the spacer tube 32 may be slidably positioned along the horizontal support bar 28 in order to change the relative distribution of force on each of the springs 24,26. This is particularly useful when the lower mounting point is not centered across the width of the bag 14. The spacer tube 32 can be slidably positioned to redistribute the tension in each of the springs 24,26 in order to insure that a vertical downward force is applied to each of the hooks 19-20.

Referring again to FIG. 1 a spring clip 40 is preferably mounted on the back face 16 of the pannier. This clip may be snapped into position over the upper support member 22 of the carrier frame 12 upon installation to further insure that each of the hooks 18–20 remain in place on the carrier frame 12 in the event that the spring force caused by the lower mounting mechanism is overcome by oppositely directed inertial forces caused by a sudden jolt during transport. The spring clip 40 is generally available and the type of clip which is preferably used is manufactured by the Ludwig Company of Racine, Wis.

It should be noted that the hooks 19–20, the spring clip 40, and the horizontal support bar 28 are releasably secured to the pannier bag 14 and the rigid support panel 18 by use of conventional fasteners such as nuts and bolts.

Thus the pannier with hook and spring mounting mechanism disclosed in the present invention may be installed upon the carrier frame of a bicycle quickly and easily. The triangular configuration of the lower spring mechanism evenly distributes the spring forces across the width of the pannier. In addition the relative forces on each of the springs 24,26 may be redistributed by slidably positioning the spacer tube 32 in order to insure that the force upon each of the hooks 19–20 is in a vertical direction.

Other aspects, objects and advantages of this invention can be obtained from a study of the drawings, the disclosure, and the appended claims.

I claim:

1. A pannier bag mounting mechanism including:
   a plurality of hook members adapted to grasp the upper horizontal member of a bicycle carrier frame;
   a rigid elongate member secured in a generally horizontal position to the back portion of the pannier bag;
   a spacing member slideably mounted on the rigid elongate member; and
   a resilient member slideably mounted at two points along the rigid elongate member with the spacing member located on the elongate member between the two points, the resilient member including means for releasably securing the resilient member to a lower portion of a bicycle carrier frame, whereby
   when the resilient member is anchored to the lower portion of the carrier frame, a downward force is exerted upon the rigid elongate member at each of the points where the resilient member is slideably mounted upon the rigid elongate member, tending to urge the hook members downward over the upper horizontal member of the carrier frame in a secure and balanced fashion.

2. The apparatus of claim 1 wherein the spacing member is a tube of flexible material having an inner diameter large enough to allow for the tube to be slideably positioned along the horizontal rigid elongate member.

3. The apparatus of claim 1 wherein the resilient member includes a pair of springs, each of the springs mounted at one end to the rigid elongate member and releasably anchored at the opposite end to a lower portion of a carrier frame.

4. The apparatus of claim 3 wherein the resilient member includes an anchoring ring mounted to the opposite end of each of the springs and adapted to engage a lower portion of a carrier frame.

5. A pannier bag including:
   a relatively non-rigid bag portion;
   a rigid support panel secured to the back face of the back portion of the bag;
   at least two hook members secured to the support panel and adapted to grasp the upper horizontal member of a carrier frame;
   a rigid elongate lower support bar secured at each end to the support panel in a generally horizontal position;
   an elongate spacer tube slideably mounted on the lower support bar;
   an anchor ring;
   a first spring member slideably mounted at one end on the lower support bar and secured at the other end to the anchor ring; and
   a second spring member slideably mounted at one end on an exposed portion of the support bar at the opposite end of the spacer tube and secured at the other end to the anchor ring, whereby
   when the anchor ring is affixed to a lower portion of a carrier frame, the spring members are pulled into tension and exert a downward force upon the support bar at each of two points on opposite sides of the spacer tube, urging the hook members downward over the upper horizontal member of the carrier frame and securing the pannier bag thereto in a balanced fashion.

* * * * *